United States Patent
Smith-Creasey et al.

(10) Patent No.: US 12,399,959 B2
(45) Date of Patent: Aug. 26, 2025

(54) EXTENDED REALITY ACCESS CONTROL

(71) Applicant: BRITISH TELECOMMUNICATIONS PUBLIC LIMITED COMPANY, London (GB)

(72) Inventors: Max Smith-Creasey, London (GB); Oliver Baxandall, London (GB); Tiago Andrade, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 196 days.

(21) Appl. No.: 18/259,053

(22) PCT Filed: Dec. 1, 2021

(86) PCT No.: PCT/EP2021/083787
§ 371 (c)(1),
(2) Date: Jun. 22, 2023

(87) PCT Pub. No.: WO2022/135857
PCT Pub. Date: Jun. 30, 2022

(65) Prior Publication Data
US 2024/0056452 A1    Feb. 15, 2024

(30) Foreign Application Priority Data
Dec. 23, 2020    (GB) ..................................... 2020521

(51) Int. Cl.
*G06F 21/00* (2013.01)
*G06F 21/10* (2013.01)
*H04L 9/40* (2022.01)

(52) U.S. Cl.
CPC .......... *G06F 21/10* (2013.01); *H04L 63/0861* (2013.01); *H04L 63/102* (2013.01)

(58) Field of Classification Search
CPC ............. G06F 21/10; G06F 2221/2137; G06F 21/316; G06F 21/629; G06F 21/32; H04L 63/0861; H04L 63/102
See application file for complete search history.

(56) References Cited

U.S. PATENT DOCUMENTS 6,106,395 A    8/2000 Begis
6,571,216 B1    5/2003 Garg et al.
(Continued)

FOREIGN PATENT DOCUMENTS

KR    20180105405 A    9/2018

OTHER PUBLICATIONS

International Preliminary Report on Patentability for PCT/EP2021/083787 dated Jul. 6, 2023 (10 pages).
(Continued)

*Primary Examiner* — Kendall Dolly
(74) *Attorney, Agent, or Firm* — Nixon & Vanderhye P.C.

(57) ABSTRACT

A computer implemented method of controlling access by a requesting user to a restricted resource in an extended reality environment, the method comprising: permitting access, by the requesting user, to the restricted resource; monitoring characteristics of the requesting user during use of the restricted resource, the characteristics including one or more of biometric and behavioural information for the user accessing the resource; accessing a profile data store containing a plurality of profiles of users having accessed the restricted resource, each profile including at least one of biometric and behavioural information for a respective user accessing the resource; responsive to a determination that the characteristics of the requesting user corresponds to at least one profile, inhibiting access, by the requesting user, to the restricted resource.

18 Claims, 2 Drawing Sheets

(56) References Cited

U.S. PATENT DOCUMENTS

| | | | |
|---|---|---|---|
| 6,839,680 B1 | 1/2005 | Liu et al. | |
| 7,657,907 B2 | 2/2010 | Ferman et al. | |
| 10,474,815 B2* | 11/2019 | Turgeman | G06F 21/316 |
| 2016/0234210 A1 | 8/2016 | Rydkin et al. | |
| 2017/0235931 A1 | 8/2017 | Publicover et al. | |
| 2018/0288041 A1 | 10/2018 | Zavesky et al. | |
| 2018/0295130 A1* | 10/2018 | Lee | H04L 63/0861 |
| 2019/0122443 A1 | 4/2019 | Stöcker | |
| 2020/0028843 A1 | 1/2020 | Watson et al. | |
| 2023/0156296 A1* | 5/2023 | VanSickel | H04N 21/4532 725/25 |
| 2024/0031367 A1* | 1/2024 | Pringle | H04L 63/0815 |

OTHER PUBLICATIONS

Florian Baumann, et al., "Hardcore Gamer Profiling: Results from an unsupervised learning approach to playing behavior on the Steam platform", Procedia Computer Science, vol. 126, 2018, pp. 1289-1297 (9 pages).

Ben Meuleman, et al., "Induction and Profiling of Strong Multi-Componential Emotions in Virtual Reality", IEEE Transactions on Affective Computing, vol. 12, No. 1, Jan.-Mar. 2021, pp. 189-202 (14 pages).

Michail Tsikerdekis, et al., "Detecting and Preventing Online Identity Deception in Social Networking Services", IEEE Internet Computing, May/Jun. 2015, pp. 41-49.

Wei Wang, et al., "Profiling Program and User Behaviors for Anomaly Intrusion Detection Based on Non-negative Matrix Factorization", IEEE, 2004, pp. 99-104 (6 pages).

Combined Search and Examination Report for GB Application No. 2020521.7 dated Aug. 31, 2021, 12 pages.

International Search Report and Written Opinion of the ISA for PCT/EP2021/083787 dated Feb. 8, 2022, 12 pages.

* cited by examiner

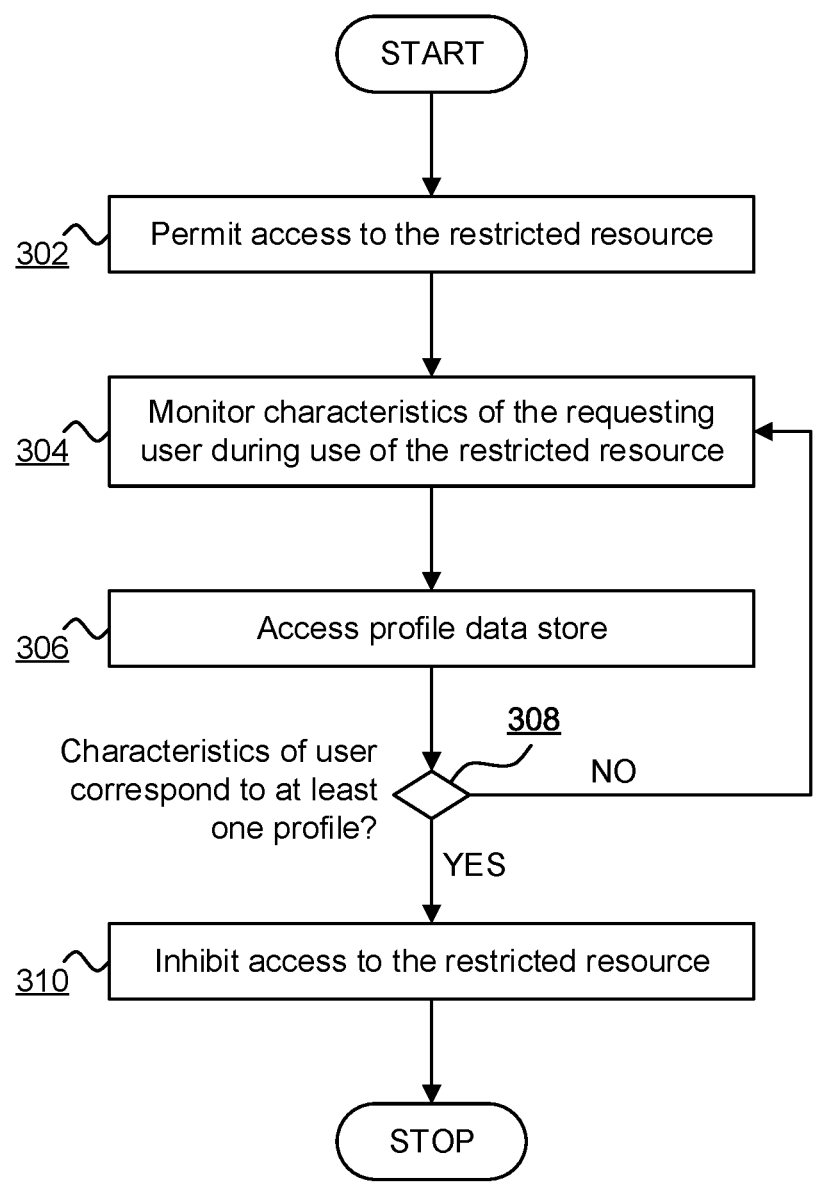

EXTENDED REALITY ACCESS CONTROL

This application is the U.S. national phase of International Application No. PCT/EP2021/083787 filed Dec. 1, 2021 which designated the U.S. and claims priority to GB Patent Application No. 2020521.7 filed Dec. 23, 2020, the entire contents of each of which are hereby incorporated by reference.

BACKGROUND AND SUMMARY

The present invention relates to controlling access to a restricted resource in an extended reality environment.

Extended reality (XR) environments include any or any combinations of virtual reality, mixed reality and augmented reality environments provided by computer systems in which users interact with visual representations of virtual and/or real resources such as objects, information, services and the like in a virtual environment or a real-and-virtual combined environment. Users visualise and interact with such environments using equipment including, for example, inter alia: wearables or mounted equipment such as visors, glasses, masks, gloves, clothing, footwear and the like; controllers such as handheld or otherwise interactive or mounted control equipment; sensors such as body-mounted sensors, eye tracking sensors, body part, limb and/or head position, orientation and/or movement sensors, location sensors and the like; and other equipment whether known or foreseeable was will be apparent to those skilled in the art.

Resources in an XR environment can be restricted access such that their access is not generally available to users of the XR environment. For example, virtual objects, software services, functions and functionality, data storage, processing, interfaces, facilities, programs, applications and other resources may be restricted. In particular, access to such resources may be permitted on a temporary, trial, experimental or test basis such that continued access is permitted only within one or more constraints such as a limited time period, limited extent of use or the like. A user can enjoy access to such resources according to such constraints until the extent of the constraints are exceeded, such as a limited time period expires, whereupon access to the resource may be inhibited such as by ceasing access to the resource for the user or adjusting a permitted extent of access. For example, an extent of permitted access can be adjusted by reducing a number of features of a resource available to the user, changing one or more features of the resource such as performance or availability, or other adjustments to the permitted extent of access to the restricted resource as will be apparent to those skilled in the art.

A challenge arises when a user seeks to abuse restricted resource access by using a resource multiple times, each time within prescribed constraints, but each time under a different personality such as a different user account, different equipment, different credentials or the like. For example, a user accessing a restricted resource on a trial basis using first credentials may switch to different, second credentials, to continue access to the resource when the constraints on access by the first credentials are exceeded. Thus it is desirable to address this challenge to avoid abuse of constrained availability of restricted resources.

According to a first aspect of the present invention, there is provided a computer implemented method of controlling access by a requesting user to a restricted resource in an extended reality environment, the method comprising: permitting access, by the requesting user, to the restricted resource; monitoring characteristics of the requesting user during use of the restricted resource, the characteristics including one or more of biometric and behavioural information for the user accessing the resource; accessing a profile data store containing a plurality of profiles of users having accessed the restricted resource, each profile including at least one of biometric and behavioural information for a respective user accessing the resource; responsive to a determination that the characteristics of the requesting user corresponds to at least one profile, inhibiting access, by the requesting user, to the restricted resource.

Preferably, the characteristics of the requesting user are determined to correspond to the at least one profile by a determination that a degree of similarity of the characteristics and the at least one profile exceeds a predetermined threshold degree of similarity.

Preferably, the characteristics of the requesting user are determined to correspond to the at least one profile based on a classification of the characteristics by a classifier trained based on the plurality of profiles in the profile data store.

Preferably, inhibiting access includes one of: ceasing access; and adjusting a permitted extent of access.

Preferably the method further comprises repeating the monitoring and accessing steps for at least part of a period of access, by the requesting user, to the restricted resource.

Preferably, n at least some of the characteristics of the requesting user are monitored via equipment used by the user to interact with the extended reality environment.

According to a second aspect of the present invention, there is a provided a computer system including a processor and memory storing computer program code for performing the steps of the method set out above.

According to a third aspect of the present invention, there is a provided a computer system including a processor and memory storing computer program code for performing the steps of the method set out above.

BRIEF DESCRIPTION OF THE DRAWINGS

Embodiments of the present invention will now be described, by way of example only, with reference to the accompanying drawings, in which:

FIG. 3 is a flowchart of a method of controlling access by a requesting user to a restricted resource in an XR environment according to embodiments of the present invention.

DETAILED DESCRIPTION OF PRESENT EXAMPLE EMBODIMENTS

Figure 1:
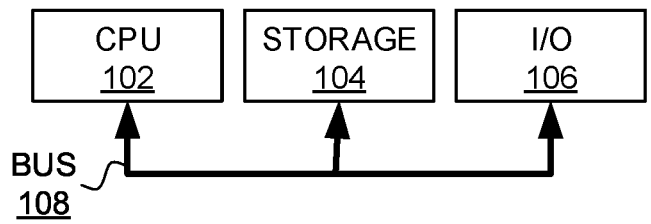
FIG. 1 is a block diagram a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
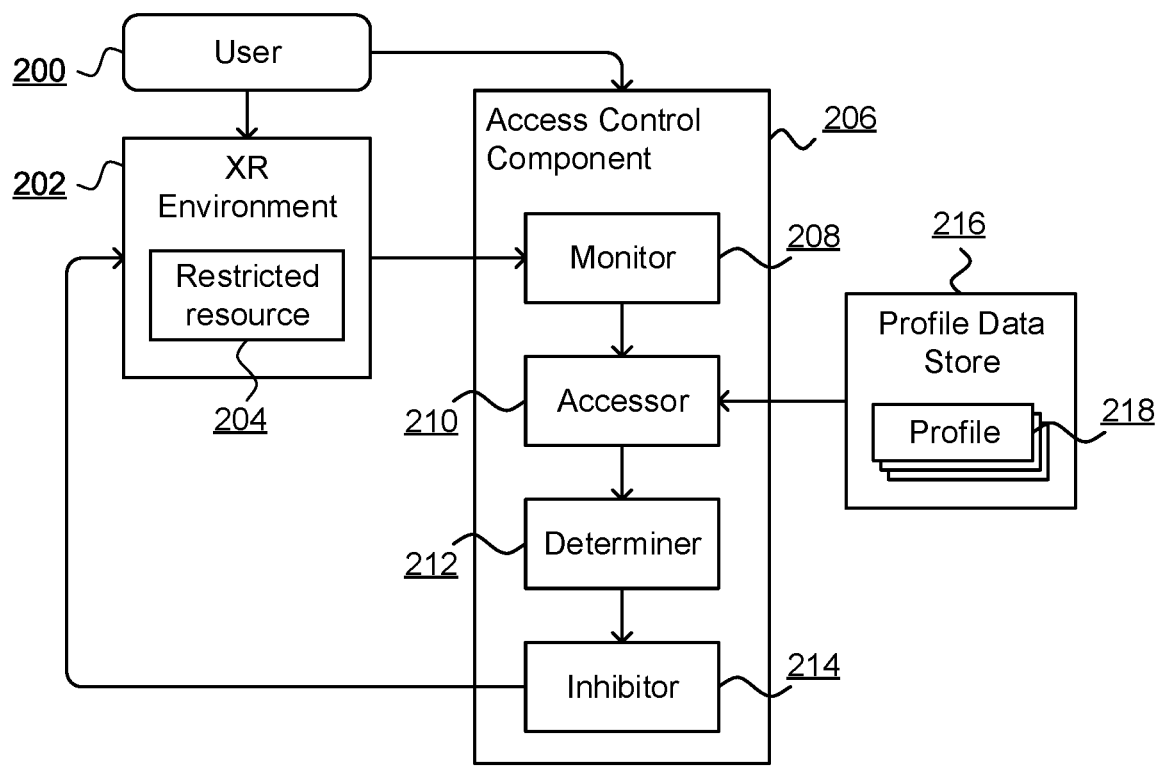
FIG. 2 is a component diagram of an access control arrangement for a restricted resource in an XR environment according to embodiments of the present invention.

FIG. 2 is a component diagram of an access control arrangement for a restricted resource in an XR environment according to embodiments of the present invention. A requesting user 200 accesses an XR environment 202 such as any or any combinations of virtual reality, mixed reality and augmented reality environments provided by a computer system (not illustrated). The user 200 employs equipment for perceiving and interacting with the XR environment 202 such as equipment previously described. The XR environment 202 includes a restricted resource 204, such as previously described, to which access is constrained for the requesting user 200 such that the restricted resource 204 is usable by the user 200 only to an extent permitted by one or more predetermined constraints, such as, inter alia: a limited time period; a limited extent of use or consumption of the resource 204; a limited number of accesses to the resource 204; a limited location or geographic area for use of the resource 204 (such as a limit with respect to a location of first access to the resource 204); and other constraints on use of the restricted resource 204 as will be apparent to those skilled in the art.

An access control component 206 is provided as a hardware, software, firmware or combination component for controlling access by the user 200 to the restricted resource 204 in the XR environment 202. In particular, the access control component 206 is operable to determine that the user 200 has previously accessed the resource 204 in a manner that may exceed the constraints on access, such as by way of a different credential, virtual user id or other user representation, and in such event to inhibit access by the user 200 to the restricted resource 204. By default, access to the resource is permitted by the access control component 206, subject to any other constraints on access such as registration, login, payment or the like that are beyond the scope of this specification. Subsequently, the access control component 206 according to embodiments of the present invention monitors one or both of behaviours and biometric information for the user 200 accessing the restricted resource 204 to determine if the user 200 matches a previous user having previously accessed the resource 204.

The access control component 206 is operable in conjunction with a profile data store 216 containing a plurality of profiles 218 of previous users having accessed the restricted resource 204. Each profile includes one or both of biometric and behavioural characteristics for the respective previous user. Biometric characteristics can include one or more of, inter alia: detection and/or measurement of physiological traits such as fingerprint, retina, palm and/or face recognition, facial metrics, body geometry such as hand geometry, limb dimensions, individual traits such as freckles, birth marks, pits, scars, and the like; and other biometric characteristics as will be apparent to those skilled in the art. Behavioural characteristics can include one or more of, inter alia: characteristics relating to the pattern of the user's behaviour such typing rhythm, gait, mouse or controller movement, signature and/or the dynamics of making such a signature; movement characteristics such as acceleration and movement profiles for limbs, voice features; head, limb or body-part orientation, rotation, movement, posture and/or pose; and other behavioural characteristics as will be apparent to those skilled in the art.

In some embodiments, the profiles 218 in the profile data store 216 are stored as feature embeddings for ready comparison. For example, in some embodiments, the profile data store 216 stores one or both of biometric and behavioural characteristics as profiles 218 for previous users by training a classifier with the characteristics so as to classify a set of characteristics as being recognised or not recognised by such trained classifier. For example, such a classifier can be realised as an artificial neural network or support vector machine. Thus, in use, the profile data store 216 can be interrogated for one or more biometric and/or behavioural characteristics to determine if the characteristics are recognised in the data store 216, such recognition being indicative of a correspondence between such characteristics and at least one profile 218 in the profile data store.

The access control component includes a monitor component 208 as a hardware, software, firmware or combination component arranged to monitor characteristics of the user 200 accessing the restricted resource 204. In particular, the monitor 208 monitors characteristics of the user 200 that are one or both of biometric and behavioural characteristics of the user 200, in use, during access to the restricted resource 204. Such biometric and behavioural characteristics include, inter alia, those described above with respect to the profiles 218. The characteristics of the user 200 accessing the resource 204 are preferably monitored using equipment used by the user to perceive and/or interact with the XR environment 202. For example, sensors provided with, as part of, or to constitute the equipment for perceiving and/or interacting with the XR environment 202 may be used to determine biometric and/or behavioural characteristics of the user 200 accessing the resource 204. In some embodiments, additional facilities are employed to determine at least some of the characteristics such as specific equipment not otherwise required for perceiving and/or interacting with the XR environment 202.

The access control component 206 further includes an accessor component 210 as a hardware, software, firmware or combination component arranged to access the profile data store 216 such as by reading profiles 218 from the profile data store or by executing, invoking, triggering, interfacing with or otherwise operating with the data store 218. The accessor 210 is used by a further component, a determiner 212, as a hardware software firmware or combination component for determining if the monitored characteristics of the user 200 accessing the resource 204 correspond to at least one profile 218 in the profile data store 216. Such correspondence can be determined as a degree of similarity of characteristics of the user 200 when compared with characteristics in a profile 218 in the data store 216. Additionally or alternative, such correspondence can be determined based on a classification of the characteristics of the user 200 by a classifier trained on the basis of the profiles 218 in the data store 216.

Responsive to the determination of the determiner 212 of a correspondence between the characteristics of the user 200 accessing the resource 204 and at least one profile 218 in the data store, an inhibitor component 214 is operable to inhibit access, by the requesting user 200, to the restricted resource 204. The inhibitor component is a hardware, software, firmware or combination component that performs such inhibition by, for example, ceasing access to the resource 204 by the user 200, or adjusting a permitted extent of access to the resource 204 by the user 200. For example, an extent of permitted access to the resource 204 can be adjusted by, inter alia: reducing a number of features of the resource 204 available to the user 200; changing one or more features of the resource 204 such as performance or availability; and/or other adjustments to the permitted extent of access to the restricted resource 204 as will be apparent to those skilled in the art.

Preferably, at least the monitoring by the monitor 208 and accessing by the accessor 210 are performed repeatedly during at least part of a period of access, by the user 200, to the restricted resource 204, so that the determination by the determiner 212 and any occasioned inhibition by the inhibitor 214 can be performed as occasioned by a determination that characteristics of the user 200 correspond to at least one profile 218 in the data store 216.

FIG. 3 is a flowchart of a method of controlling access by a requesting user to a restricted resource in an XR environment according to embodiments of the present invention. Initially, at step 302, access to the resource 204 is permitted for the requesting user 200. At step 304, the monitor 208 monitors one or both of biometric and behavioural characteristics of the requesting user 200 during use of the restricted resource 204. At step 306 the accessor 210 accesses the profiles 218 in the data store 216, where such access may be constituted by access to a trained classifier which can be considered to encode the profiles 218. At step 308 the determiner 212 determines if the characteristics of the user 200 correspond to at least one profile 218, such as by measuring a degree of similarity of the characteristics and the profiles 218 and/or execution of a trained classifier. Responsive to the determination, at step 310 the inhibitor 214 inhibits access to the restricted resource 204 by the requesting user 200.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A computer implemented method of controlling access by a requesting user to a restricted resource in an extended reality environment, the method comprising:
   permitting access, by the requesting user, to the restricted resource;
   monitoring characteristics of the requesting user during use of the restricted resource, the characteristics including one or more of biometric or behavioural information for the user accessing the resource;
   accessing a profile data store containing a plurality of profiles of users having accessed the restricted resource, each profile including at least one of biometric or behavioural information for a respective user accessing the resource;
   determining that the requesting user has accessed the restricted resource in a manner that exceeds one or more predetermined constraints on access, based on a determination that the monitored characteristics of the requesting user corresponds to at least one profile in the profile data store; and
   inhibiting access, by the requesting user, to the restricted resource,
   wherein the monitored characteristics of the requesting user are determined to correspond to the at least one profile either:
      by a determination that a degree of similarity of the monitored characteristics and the at least one profile exceeds a predetermined threshold degree of similarity; or
      based on a classification of the monitored characteristics by a classifier trained based on the plurality of profiles in the profile data store.

2. The method of claim 1 wherein inhibiting access includes one of: ceasing access; and adjusting a permitted extent of access.

3. The method of claim 1 further comprising repeating the monitoring and accessing steps for at least part of a period of access, by the requesting user, to the restricted resource.

4. The method of claim 1 wherein at least some of the characteristics of the requesting user are monitored via equipment used by the user to interact with the extended reality environment.

5. A non-transitory computer readable storage medium comprising computer program code to, when loaded into a computer system and executed thereon, cause the computer system to perform the steps of the method as claimed in claim 1.

6. The method of claim 1 wherein inhibiting access includes ceasing access.

7. The method of claim 1 wherein inhibiting access includes adjusting a permitted extent of access.

8. The method of claim 1 wherein each profile includes both biometric and behavioural information for the respective user accessing the restricted resource.

9. The method of claim 1 wherein the one or more predetermined constraints on access is a limited time period or extent of use or consumption of the restricted resource.

10. The method of claim 1 wherein the one or more predetermined constraints on access is a limited number of accesses to the restricted resource.

11. The method of claim 1 wherein the one or more predetermined constraints on access is a limited location or geographic area for use of the restricted resource.

12. A computer system for controlling access by a requesting user to a restricted resource in an extended reality environment, the computer system comprising: a processor and memory storing computer program code, the processor being configured to execute the computer program code such that the computer system is at least configured to:

permit access, by the requesting user, to the restricted resource;

monitor characteristics of the requesting user during use of the restricted resource, the characteristics including one or more of biometric or behavioural information for the user accessing the resource;

access a profile data store containing a plurality of profiles of users having accessed the restricted resource, each profile including at least one of biometric or behavioural information for a respective user accessing the resource;

determine that the requesting user has accessed the restricted resource in a manner that exceeds one or more predetermined constraints on access, based on a determination that the monitored characteristics of the requesting user corresponds to at least one profile in the profile data store; and inhibit access, by the requesting user, to the restricted resource, wherein the monitored characteristics of the requesting user are determined to correspond to the at least one profile either:

by a determination that a degree of similarity of the monitored characteristics and the at least one profile exceeds a predetermined threshold degree of similarity; or based on a classification of the monitored characteristics by a classifier trained based on the plurality of profiles in the profile data store.

13. The computer system of claim 12 wherein the inhibition of the access includes ceasing the access.

14. The computer system of claim 12 wherein the inhibition of the access includes adjusting a permitted extent of access.

15. The computer system of claim 12 wherein each profile includes both biometric and behavioural information for the respective user accessing the restricted resource.

16. The computer system of claim 12 wherein the one or more predetermined constraints on access is a limited time period or extent of use or consumption of the restricted resource.

17. The computer system of claim 12 wherein the one or more predetermined constraints on access is a limited number of accesses to the restricted resource.

18. The computer system of claim 12 wherein the one or more predetermined constraints on access is a limited location or geographic area for use of the restricted resource.

* * * * *